United States Patent
Chipman

(10) Patent No.: US 11,202,534 B1
(45) Date of Patent: Dec. 21, 2021

(54) POT AND LID HOLDING DEVICE

(71) Applicant: Robert R. Chipman, Lakewood, CO (US)

(72) Inventor: Robert R. Chipman, Lakewood, CO (US)

( * ) Notice: Subject to any disclaimer, the term of this patent is extended or adjusted under 35 U.S.C. 154(b) by 0 days.

(21) Appl. No.: 17/215,519

(22) Filed: Mar. 29, 2021

(51) Int. Cl.
*A47J 47/16* (2006.01)

(52) U.S. Cl.
CPC ..................... *A47J 47/16* (2013.01)

(58) Field of Classification Search
CPC . A47J 47/16; A47J 36/12; A47J 45/02; A47B 81/04; A47G 25/10; A47G 1/1646; A47F 7/0064; A47F 5/08
USPC .... 211/41.11, 70.7, 41.2, 87.01, 85.7, 85.18, 211/89.01, 86.01, 119.001, 41.1; 248/37.3
See application file for complete search history.

(56) References Cited

U.S. PATENT DOCUMENTS

| | | | | |
|---|---|---|---|---|
| 428,555 A * | 5/1890 | Dom | ...................... | B42F 17/08 211/11 |
| 674,868 A * | 5/1901 | Lane | ...................... | A47J 47/16 211/41.11 |
| 919,896 A * | 4/1909 | Lemke | ................... | A47B 81/04 211/41.2 |
| 1,192,965 A * | 8/1916 | White | ...................... | A47G 21/14 211/70.7 |
| 1,394,947 A * | 10/1921 | Singer | ..................... | A47J 47/16 211/41.2 |
| 1,608,497 A * | 11/1926 | Fischer | .................. | A47B 61/04 211/106 |
| 1,814,692 A * | 7/1931 | Harris | ..................... | A47J 47/16 211/123 |
| 2,439,438 A * | 4/1948 | Thomson | ................ | D06F 79/02 248/117.7 |
| 2,608,305 A * | 8/1952 | Sager | ...................... | A47J 47/16 211/49.1 |
| D245,053 S * | 7/1977 | Domansky | .................... | D6/552 |
| 4,108,312 A * | 8/1978 | Craven | .................. | A63B 60/58 211/85.7 |
| D257,193 S * | 10/1980 | Glage | ........................... | D6/552 |
| D268,309 S * | 3/1983 | Wall | ............................... | D6/552 |
| 4,850,556 A * | 7/1989 | Otani | ...................... | A47J 47/16 248/206.2 |
| 4,911,310 A * | 3/1990 | Raishe | .................... | A47J 47/16 211/41.11 |

(Continued)

FOREIGN PATENT DOCUMENTS

| | | |
|---|---|---|
| CN | 107028520 A | 8/2017 |
| FR | 2890842 A1 | 3/2007 |

*Primary Examiner* — Hiwot E Tefera
(74) *Attorney, Agent, or Firm* — Bold IP, PLLC

(57) ABSTRACT

One or more embodiments of a device for holding a pot or pan and a lid are disclosed. The device includes a base, a front holder element, a first holder element, a second holder element, and an attachment extension. The base includes a front surface which extends in a front plane. The first holder element is attached to the front surface between the front surface and the front holder element. The first holder element includes a first surface extending in a first plane. The second holder element is attached to the front surface between the front surface and the front holder element. The second holder element includes a second surface extending in a second plane. The second plane is different from the first plane. The attachment extension is attached to the front surface.

19 Claims, 9 Drawing Sheets

(56) References Cited

U.S. PATENT DOCUMENTS

| | | | | |
|---|---|---|---|---|
| 4,998,627 | A * | 3/1991 | Elder | A47F 5/08 |
| | | | | 211/41.11 |
| 6,505,746 | B1 * | 1/2003 | Johnson | A47J 47/16 |
| | | | | 211/70.7 |
| 7,104,409 | B2 | 9/2006 | Morgan | |
| 7,419,129 | B2 * | 9/2008 | Kixmoeller | A47J 47/16 |
| | | | | 248/316.4 |
| 10,561,280 | B1 * | 2/2020 | Creel | A47J 47/16 |
| 2009/0057246 | A1 | 3/2009 | Kraft | |
| 2009/0173703 | A1 * | 7/2009 | Einbinder | A47J 47/16 |
| | | | | 211/41.11 |
| 2011/0000864 | A1 | 1/2011 | Moore | |
| 2011/0260023 | A1 * | 10/2011 | Braun | A47J 43/287 |
| | | | | 248/220.21 |
| 2015/0282616 | A1 * | 10/2015 | Weis | A47J 47/16 |
| | | | | 211/41.11 |

* cited by examiner

POT AND LID HOLDING DEVICE

FIELD OF THE DISCLOSURE

The present invention relates to devices for holding pots or pans along with lids for pots or pans. The holders may be secured to walls or other structures in a kitchen.

BACKGROUND

Pots and pans and their lids are often stored separately and can be difficult to keep organized. Sometimes pots are stacked in cabinets with smaller pots inside larger pots and the lids stacked separately. This organization system can make it difficult to get larger pots out because there are several other pots inside the larger pots. Also, it is difficult to find a matching lid because the pots and lids are stored separately. Further, pans with non-stick or other similar surfaces can be damaged by heavy metal objects (such as pots, pans, and lids) being rubbed together when stacked pots and pans are moved.

Other times, pots are suspended from storage racks in a kitchen and the lids are held separately. Although this provides easier access to pots (if a person is tall enough to reach the suspended pots), it does not solve the problem of lids being stored separately and the annoyance of finding a matching lid.

SUMMARY

One or more embodiments are provided below for a device for holding a pot or pan and the lid for the pot or pan. The device may include a base, a front holder element, a first holder element, a second holder element, and an attachment extension. The base may include a front surface which extends in a front plane. The first holder element may be attached to the front surface between the front surface and the front holder element. The first holder element may include a first surface. The first surface may extend in a first plane. The first plane may not be parallel to the front plane. The second holder element may be attached to the front surface between the front surface and the front holder element. The second holder element may include a second surface. The second surface may extend in a second plane. The second plane may not be parallel to the front plane and the second plane may be different from the first plane. The attachment extension may be attached to the front surface.

The device may provide significant advantages over the devices known in the art. The holder (first holder element, second holder element, and front holder element) in combination with the base may provide a slot for a lid to be stored. The attachment extension (hook or other similar device) may provide a means for the pot to be suspended over the holder with the front holder element between the pot and the lid. The separation between the pot and the lid prevents the lid from contacting the pot and thus prevents the lid and pot from scratching or otherwise damaging one another. Accordingly, the device allows the pot and lid to be held together without damaging each other. The device may be secured to a wall or other structure so that the device may be in a convenient location for a person to access the pot and lid. Accordingly, the device provides advantages in accessibility and also in keeping the pot and lid together.

Other advantageous features as well as other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
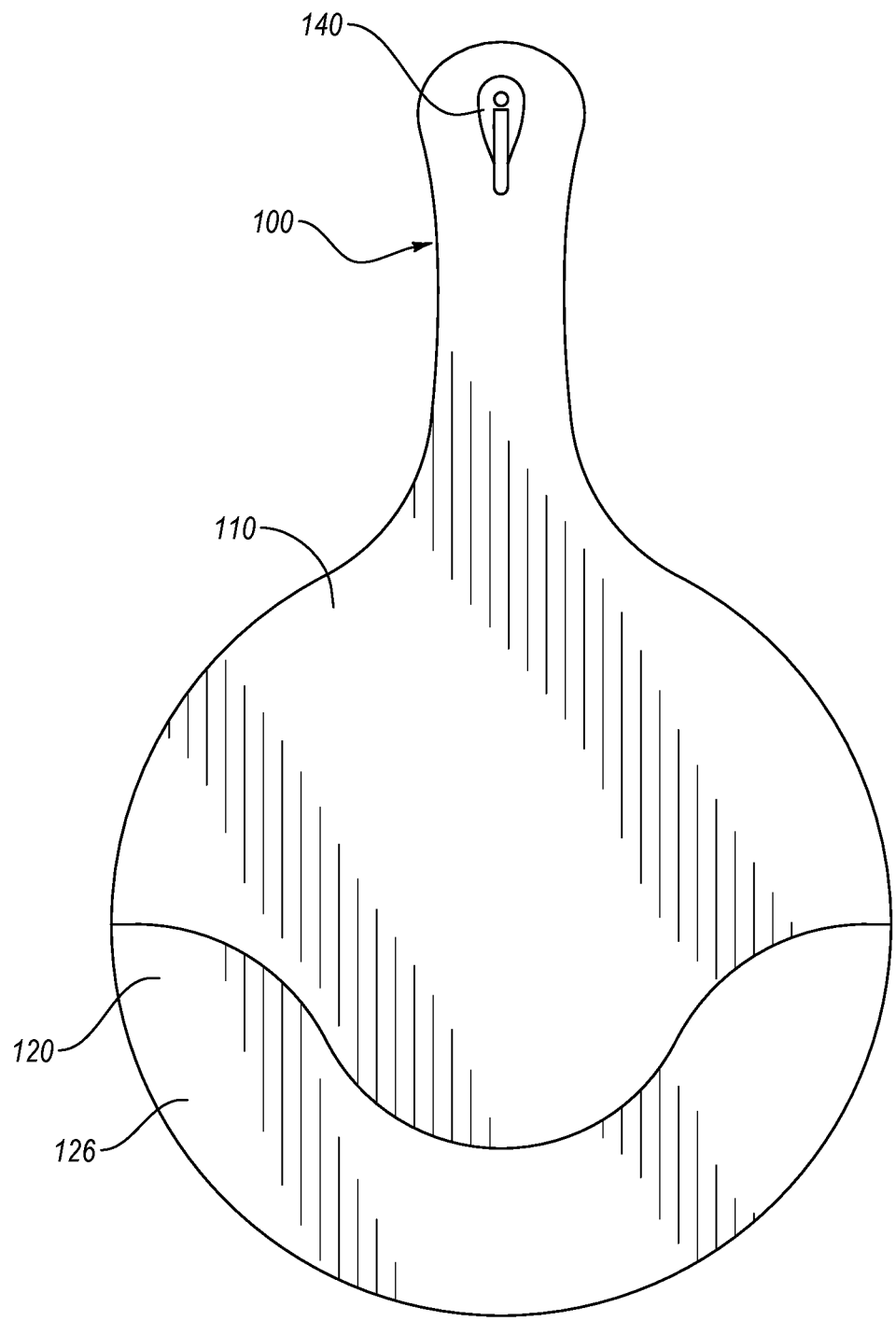
FIG. 1 shows an example front view of a pot or pan and lid holding device.

In the Summary above and in this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

Referring now to the drawings and the following written description of the present invention, it will be readily understood by those persons skilled in the art that the present invention is susceptible to broad utility and application. Many embodiments and adaptations of the present invention other than those herein described, as well as many variations, modifications, and equivalent arrangements will be apparent from or reasonably suggested by the present invention and the detailed description thereof, without departing from the substance or scope of the present invention. This disclosure is only illustrative and exemplary of the present invention and is made merely for purposes of providing a full and enabling disclosure of the invention.

FIG. 1 shows an example front view of a pot or pan and lid holding device 100.

The holding device 100 may include a base 110, a front holder element 126, and an attachment extension 140. The base 110 may include wood, composite, plastic and/or other durable materials suitable for holding a pot or pan and lid. The base 110 may have a front face (i.e., the face viewed in FIG. 1) that may be flat or substantially flat and extend in a front plane (i.e., the plane of FIG. 1). In some embodiments, the front face of the base 110 may not be flat. For example, the base 110 may have a greater thickness where the attachment extension 140 attaches so the pot may extend straight down from the attachment extension 140. The front plane may be any plane in which the front face of the base 110 extends. The base 110 may have a shape similar to the outline of the pot or pan that the holding device 100 is designed to hold. In some embodiments (as will be discussed in greater detail below) the base 110 may have other shapes.

The front holder element 126 may be attached to the base 110 such that a slot exists between the base 110 and the front holder 126. The front holder element 126 may extend in a front holder plane parallel to the front plane. The front holder 126 may have a concave shape such as a general 'u" shape or general 'v" shape. The front holder element 126 may have a concave indent on a top middle (from the perspective of FIG. 1) of the front holder element 126. The concave indent may be sized so at least a handle of a lid (not shown in this figure) may extend beyond the front holder element 126. Thus, the concave indent may extend through the entire thickness (direction into and out of the page for FIG. 1 and perpendicular to the front plane) of the front holder element 126 and may extend down (from the perspective of FIG. 1) at least one inch. In many embodiments the concave indent may extend down at least 20% of the height (from the perspective of FIG. 1) of the front holder element 126. This allows the size of the slit between the front holder element 126 and the base 110 to be significantly reduced, compared to a slit that would need to be large enough to fit the entire lid with a handle and thus also reduces the overall thickness of the holding device 100. This also allows for the lid to be accessed more easily by a person removing the lid from the holding device 100 (e.g., a person may grasp the lid by the handle when removing the lid from the holding device 100).

The attachment extension 140 may include a hook, clamp, latch, magnet, and/or other similar device for securing a pot (not shown in this figure) to the holding device 100. The pot may extend down from the attachment extension 140 and over at least a portion of the front holder element 126. The attachment extension 140 may include metal, plastic, composite, or other similar materials suitable for supporting the weight of a pot or pan. The attachment extension 140 may be secured to the base 110 using nails, screws, rivets, pegs, or other similar devices.

The holding device 100 may be sided to complement the size of a pot or pan and lid. For example, for a 9-inch diameter saucepan with an 8 inch handle, the base 110 may have a height of about 20 inches with a maximum width (left and right from the perspective of FIG. 1) of about 11 inches (e.g., the base 110 may have about 1-2 inches of extra room around the saucepan when hung on the attachment extension 140). The front holder element 126 may have a general 'u' shape with a total width of about 11 inches, and a length from an outside of the 'u' shape to the concave indent of about 5 inches or less, the concave indent extending down about 6 inches. If the lid has a height of about 2 inches (excluding the handle) the slit between the front holder element 126 and the base 110 may be about 1.8 inches thick.

Figure 2:
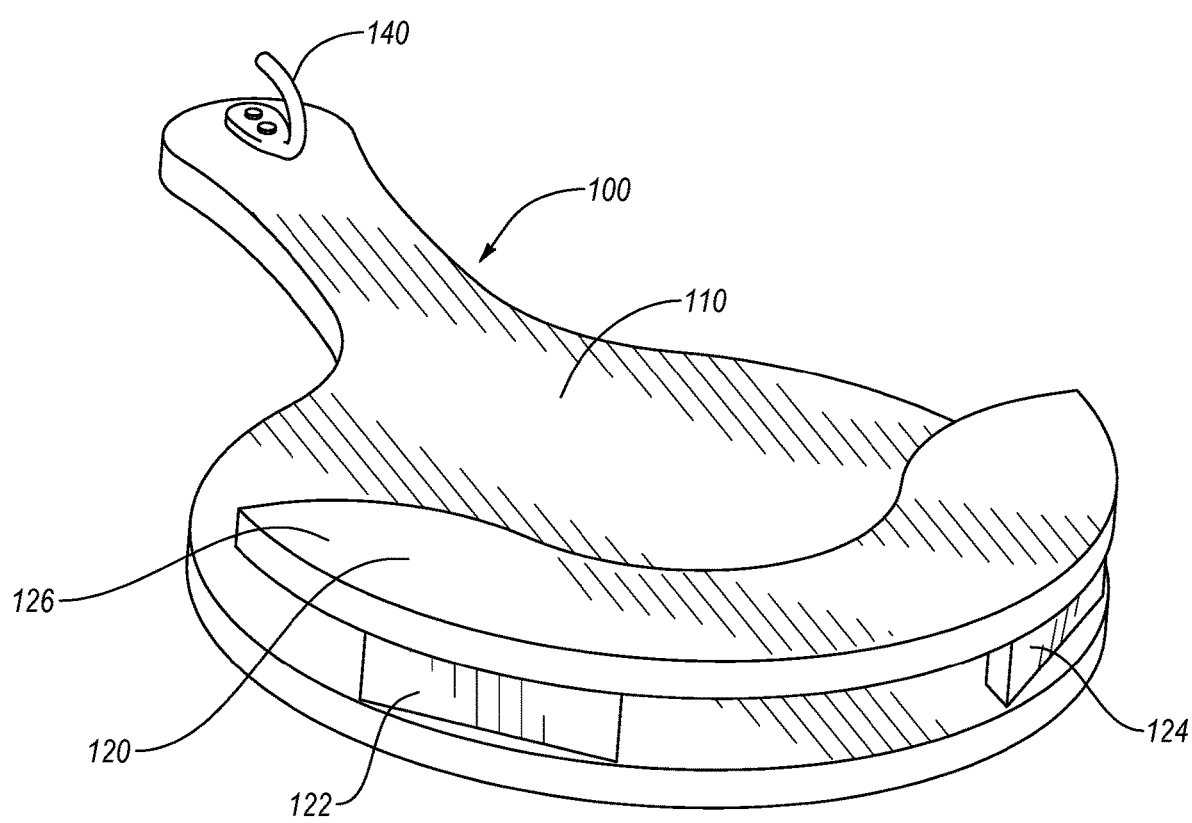
FIG. 2 shows an example front-bottom view of the holding device.

FIG. 2 shows an example front-bottom view of the holding device 100. The holding device 100 may include a first holder element 122 and a second holder element 124. The first holder element 122 may be between the front holder element 126 and front surface of the base 110. The second holder element 124 may be between the front holder element 126 and the front surface of the base 110. Accordingly, the base 110 may be attached to the front holder element 126 via the first holder element 122 and the second holder element 124. The front holder element 126, the first holder element 122, and the second holder element 124 together may be considered the holder 120. In some embodiments that first holder element 122, the second holder element 124 and the front holder element 126 may be formed together such as by molding plastic. The slit between the front holder element 126 and the base 110 may have the same thickness as the height of thickness of the first holder element 122 and the second holder element 124. Thickness being the direction into and out of the page for FIG. 1.

Figure 3:
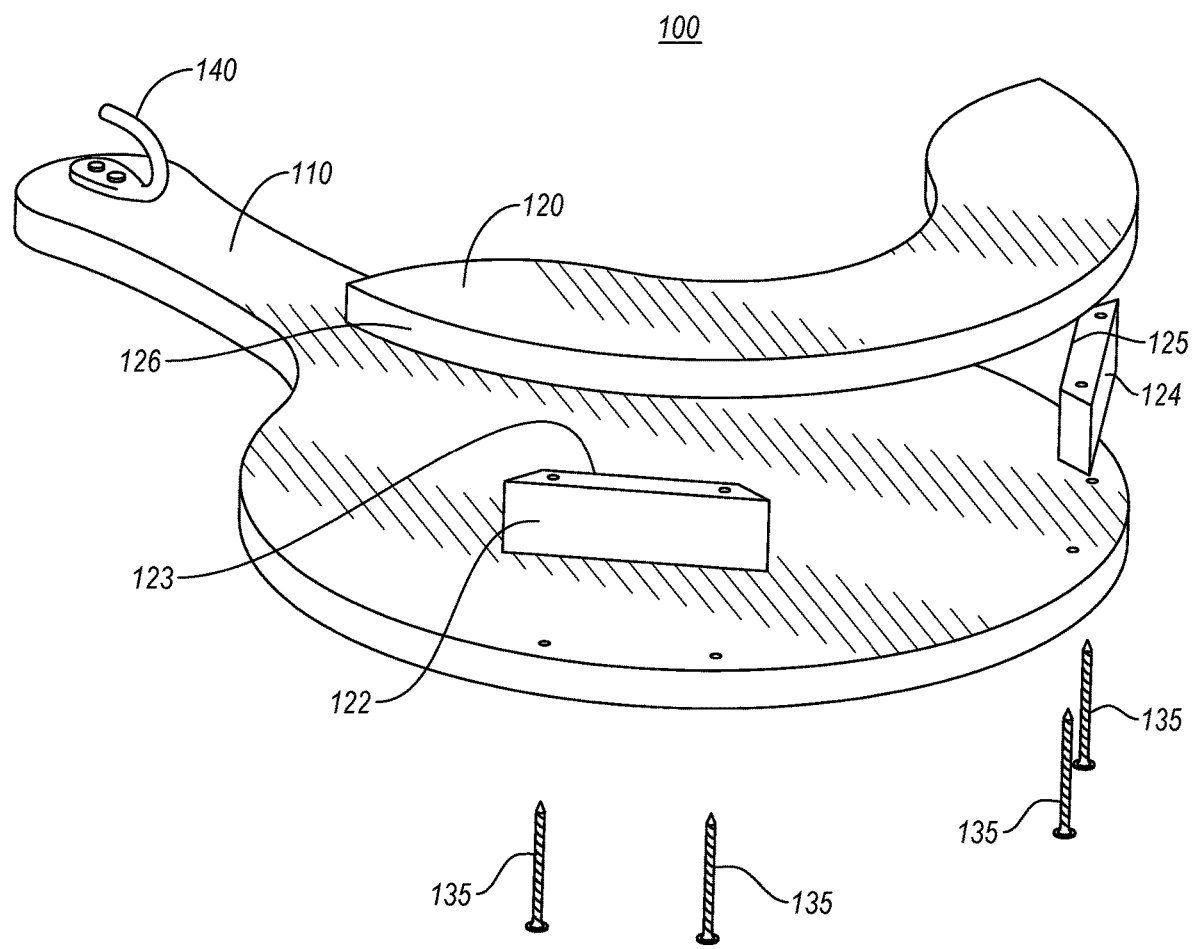
FIG. 3 shows an example exploded view of the holding device.

FIG. 3 shows an example exploded view of the holding device 100. The first holder element 122 and the second holder element 124 may have trapezoidal prism shapes. The first holder element 122 and the second holder element may also be considered legs, extensions, spacers, connectors, supports, and side walls. The first holder element 122 may include a first side 123 which faces the concave indent of the front holder element 126. The second holder element 124 may include a second side 125 which faces the concave indent of the front holder element 126. The first side 123 may extend in a first plane which is perpendicular (i.e., straight out) to the front plane. The first plane may not be parallel to the front plane. The second side 125 may extend in a second plane which is perpendicular to the front plane. The second plane may not be parallel to the front plane. The first plane may intersect the front plane and the second plane may intersect the front plane. An angle between the intersections of the first plane and the second plane intersecting the front plane may be between 45 and 150 degrees. In some embodiments, the angle may be between 90 and 150 degrees. In this way, the first holder element and the second holder element may form a general 'v' shape. The first side 123 and the second side 125 may not be flat planes in some embodiments. The first plane and the second plane may be any plane that the first side 123 and the second side 125 extend in, respectively. The first side 123 and the second side 125 may act as a guide for a lid placed in the slot between the base 110 and the front holder element 126 such that the lid will slide into a center of the slot by gravity if placed in the slot.

The first holder element 122 and the second holder element 124 element may be secured between the front holder element and the base 110 by screws 135. Alternatively, bolts, rivets, glue, dowels, welds and/or other similar methods of securing elements together may be used. The first holder element 122 and the second holder element 124 may not directly touch and a gap may exist between the first holder element 122 and the second holder element 124 in the front plane. The gap may be useful for water or debris (that may be on the lid after using the lid or washing the lid) from a lid placed in the slot to be able to fall out of the bottom of the holder 120. This feature (the gap) helps to prevent water pooling and water damage in the holding device 100 and helps to facilitate cleaning of the holding device 100.

Figure 4:
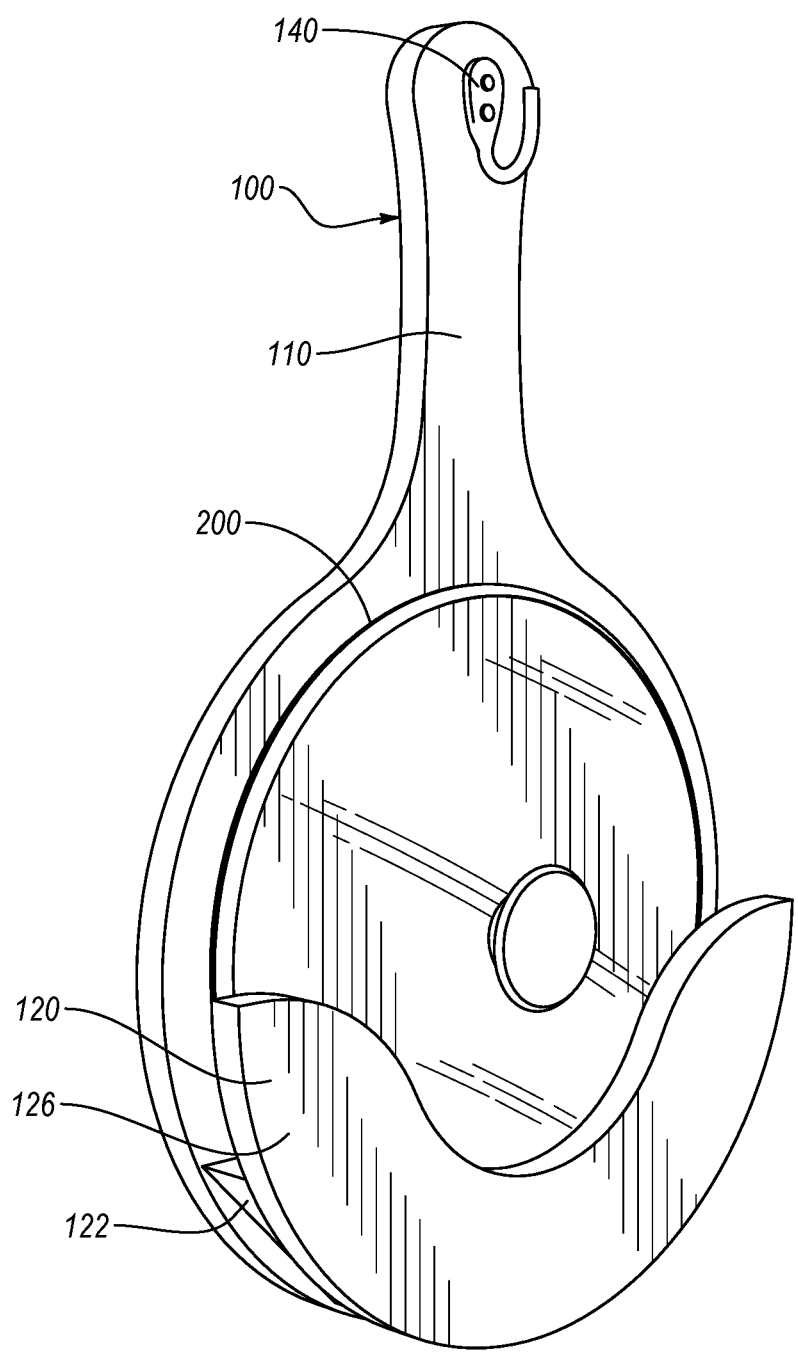
FIG. 4 shows an example side-front view of the holding device with a lid.

FIG. 4 shows an example side-front view of the holding device 100 with a lid 200. The lid 200 may be held in the slot between the base 110 and the front holder element 126. The slit may have a depth of about 40-50% of the diameter of the lid 200. Accordingly, the lid 200 when fully inserted into the slit may have about half or more of the lid 200 above the front holder element 126. The lid 200 may have a dome shape with a handle at the top of the dome shape. The handle of the lid 200 may protrude beyond the front holder element 126 in the concave indent of the front holder element 126 in the direction perpendicular to the front plane. In some embodiments, the slit may have a depth greater than half the diameter of the lid 200. Further, for lids 200 that are not circular, the slit may have different shapes to accommodate the shape of the lid 200. The slit may be arranged such that the lid 200 does not contact a pot or pan 300 (not shown in this figure) suspended from the attachment extension 140.

Figure 5:
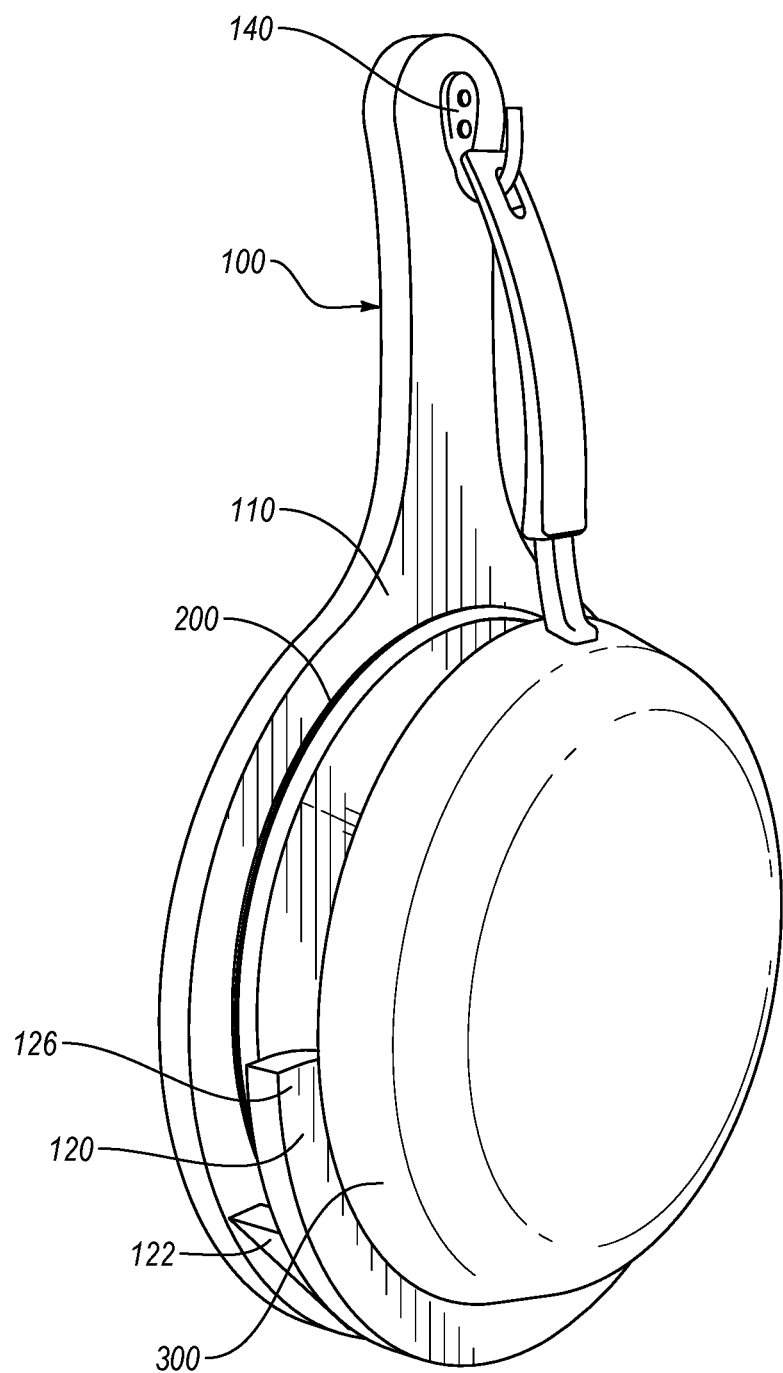
FIG. 5 shows an example side-front view of the holding device with a lid and a pan.

FIG. 5 shows an example side-front view of the holding device 100 with the lid 200 and a pan 300. The pan 300 may have a handle with a hole for hanging the pan 300. The attachment extension 140 may be a hook that passes through the hole in the handle of the pan 300 such that the pan is hung on the attachment extension 140. A portion of the pan 300 may rest on the front holder element 126 and not contact the lid 200. As discussed above, the base 110 may have a shape that compliments the shape of the pan 300 with about 1-2 inches extra material around the pan 300 in the front plane when the pan is suspended from the attachment extension 140.

Figure 6:
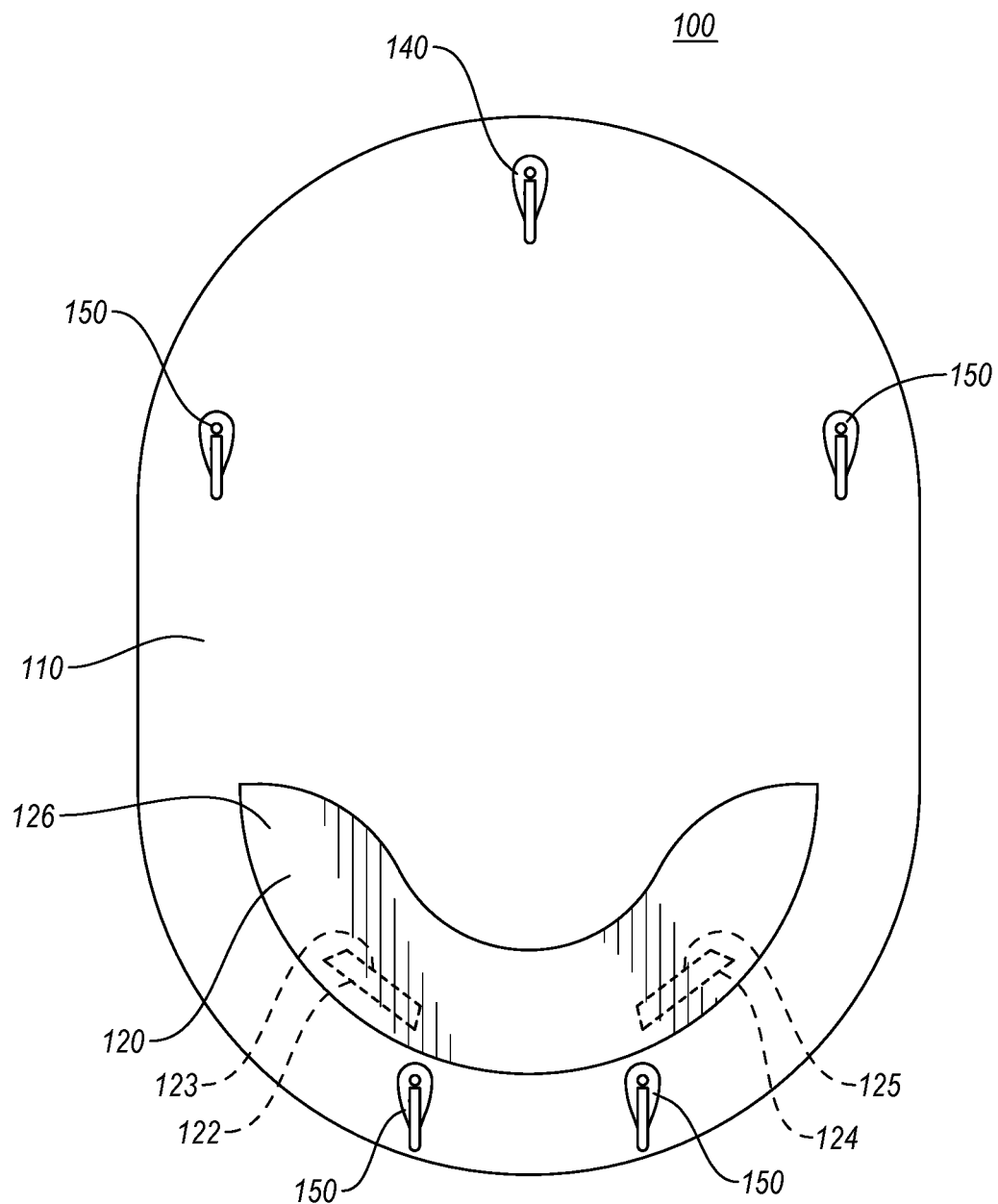
FIG. 6 shows an example front view of the holding device with an oval shaped base.

FIG. 6 shows an example front view of the holding device 100 with an oval shaped base 110. The first holder element 122 and the second holder element 124 are shown in dashed lines to show that the first holder element 122 and the second holder element 124 are below the front holder element 126. The base 110 may also have several additional attachment extensions 150. The additional attachment extensions 150 may have similar shape and function as the attachment extension 140. Cooking utensils (not shown), such as spatulas, spoons, etc., may be hung from the additional attachment extensions 150. Some of the additional attachment extensions 150 may be on the sides of the base 110 to the outside of the holder 120 so that utensils suspended from the additional attachment extensions 150 do not contact a pot or pan 300 suspended by the attachment extension 140. Some others of the additional attachment extensions 150 may be connected to the base 140 below the holder 120 such that a utensil suspended from the additional attachment extensions 150 hang below the holder 120 and do not contact a pot or pan 300 suspended from the attachment extension 140.

As discussed above, the first side 123 may extend in a first plane which is perpendicular (i.e., straight out) to the front plane. The second side 125 may extend in a second plane which is perpendicular to the front plane. The first plane may intersect the front plane in a first direction and the second plane may intersect the front plane in a second direction. An angle between the first direction and the second direction in the front plane may be between 45 and 150 degrees. The first holder element 122 and the second holder element 124 may form a general 'v' shape. The attachment extension 140 may be above the extension of the first plane in the first direction and the extension of the second plane in the second direction. Restated, the attachment extension 140 may be above the first plane and the second plane. Further, the attachment extension 140 may be above and alighted with the general "v" shape of the first holder element 122 and the second holder element 124. The attachment extension 140 may be above and aligned (e.g., vertical with respect to FIGS. 1 and 4) with the holder 120. The front holder element may completely cover the first holder element 122 and the second holder element 124 in the front plane.

Figure 7:
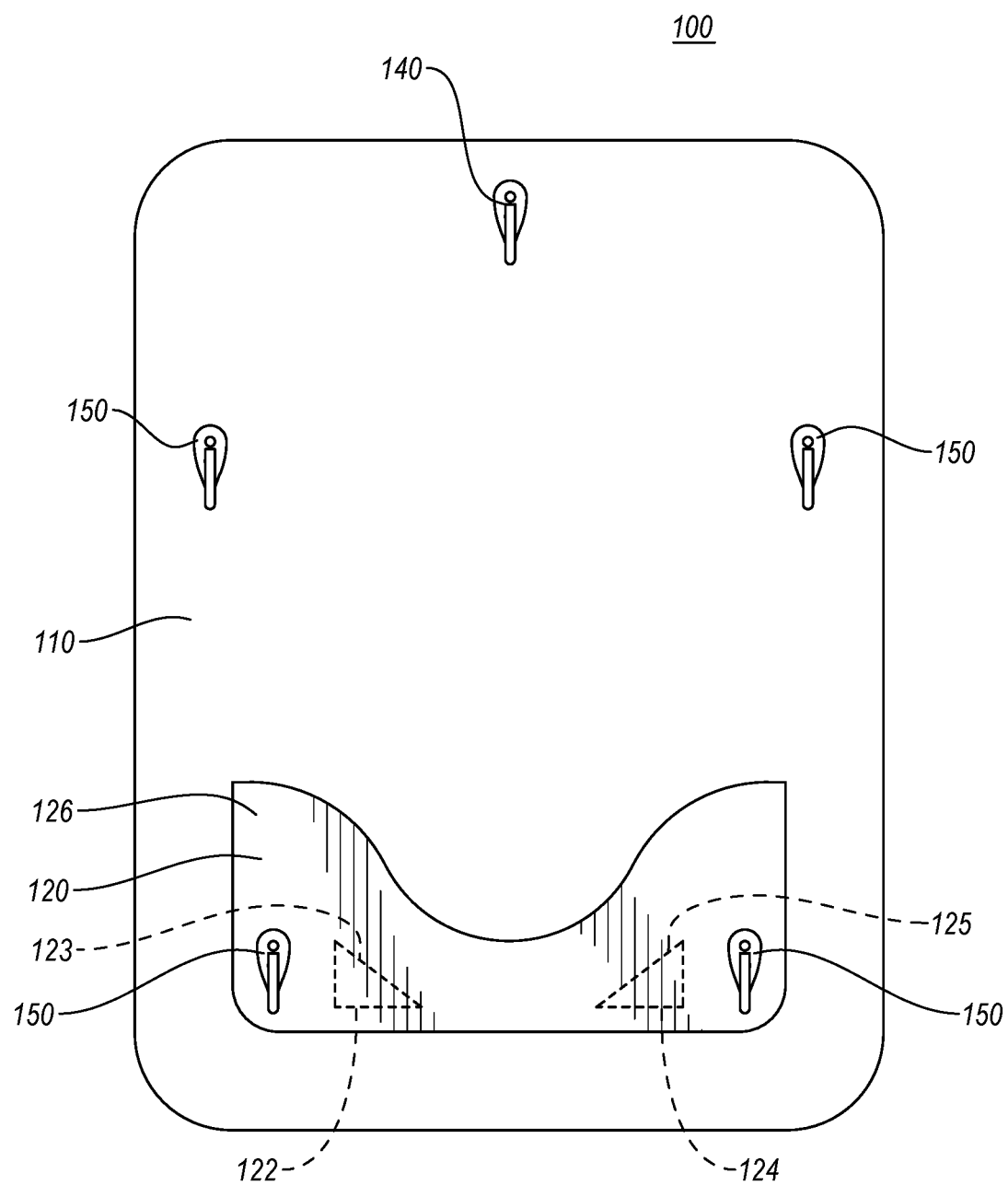
FIG. 7 shows an example front view of the holding device with a rectangular shaped base.

FIG. 7 shows an example front view of the holding device 100 with a rectangular shaped base 110. The rectangular shaped base 110 may have rounded corners. The front holder element 126 may have a somewhat rectangular shape as well with the concave indent on the top (from the perspective of FIG. 7) side of the rectangular shape. Additional attachment extensions 150 may be attached to the front holder element 126 in locations that do not interfere with or contact a pot or pan 300 suspended from the attachment extension 140. The first holder element 122 and second holder element 124 may have triangular prism shapes. In any embodiment of the holding device 100, the first holder element 122 and second holder element 124 may have other shapes such as circular (e.g., a dowel or similar structure), pentagon, half circle, etc.

Figure 8:
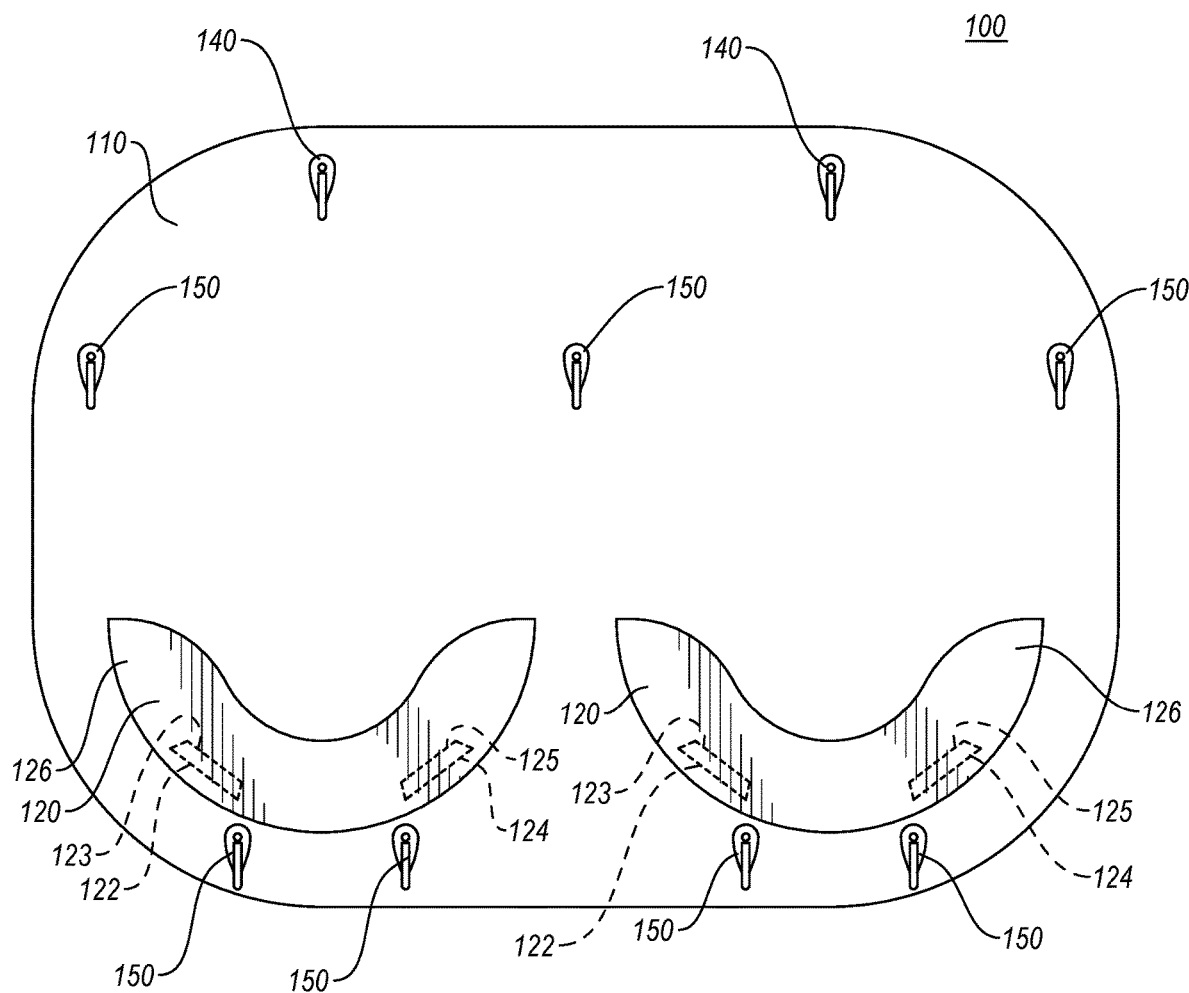
FIG. 8 shows an example front view of a holding device capable of holding two lids and two pots or pans.

FIG. 8 shows an example front view of a holding device 100 capable of holding two lids 200 (not shown) and two pots or pans 300 (not shown). The holding device 100 may include two holders 120 with two sets of first holder element 122, second holder element 124, and front holder element 126 and two attachment extensions 140 (one above and aligned with each holder 120). An additional attachment extension 150 may be above and between holders 120, such that a utensil hung from the additional attachment extension 150 may hang between the holders 120. Additionally, additional attachment extensions 150 may be included on the base to the sides of the holders 120 and below the holders 120. In some embodiments, the holders 120 may be identical. In other embodiments, the holders 120 may be arranged and sized for pots or pans of different sizes and shapes and thus are not identical.

Figure 9:
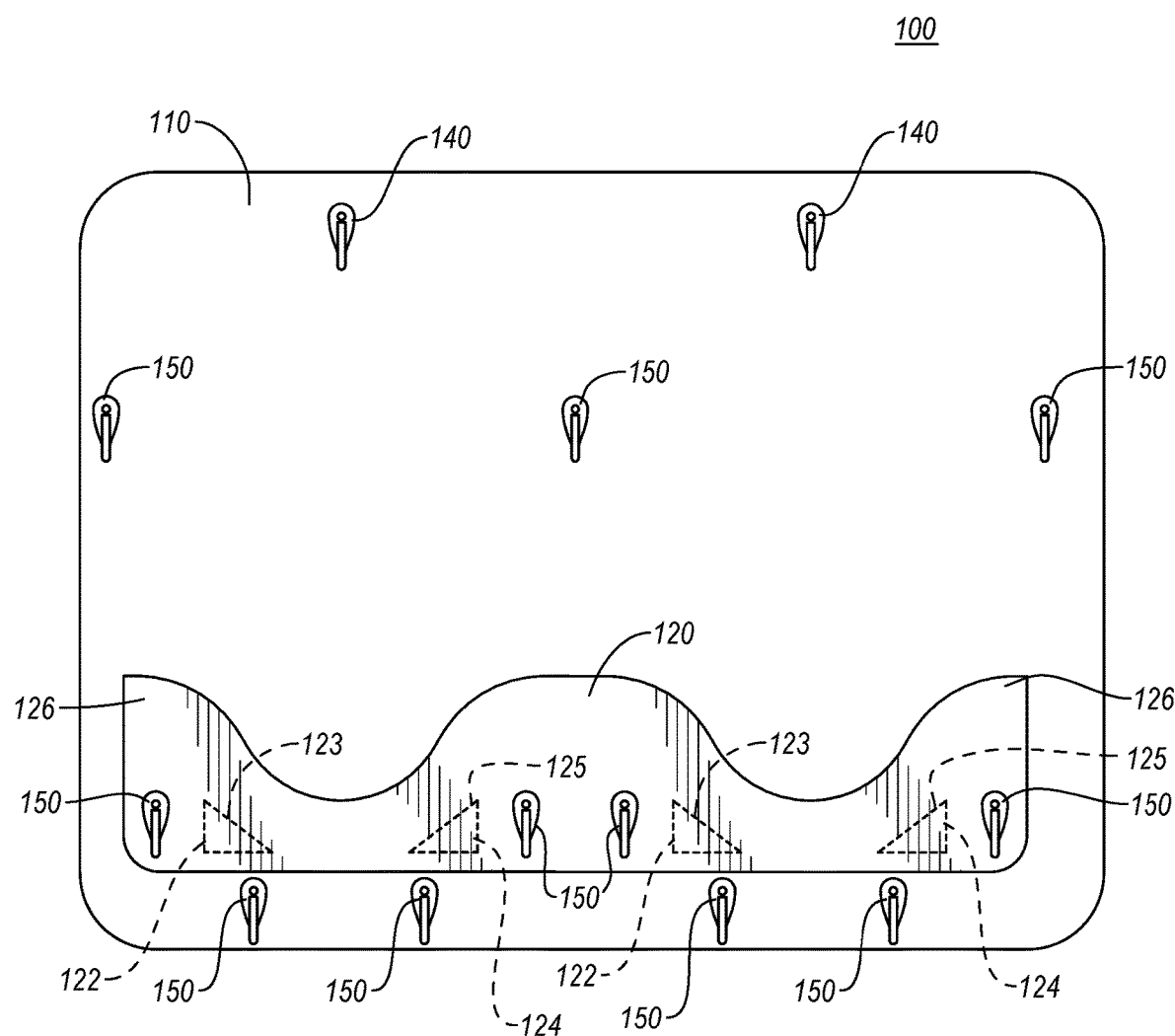
FIG. 9 shows another example front view of a holding device capable of holding two lids and two pots or pans.

FIG. 9 shows an example front view of a holding device 100 capable of holding two lids 200 (not shown) and two pots or pans 300 (not shown). The holding device 100 may have two holders 120 with the front holding element 126 for each holder 120 being attached to the other. Restated, one front holding element may be used for two holders 120 with two concave indents.

An additional attachment extension 150 may be included above the front holding element 126 in a location where a utensil suspended by the additional attachment extension 150 will not contact pots or pans hung on either of the attachment extensions 140. Additional attachment extensions 150 may also be included on the front holding element 126, on the base below the holders 120 and to the sides of the holders 120.

Many different embodiments of the inventive concepts have been shown. A person of ordinary skill in the art will appreciate that the features from different embodiments may be combined or replaced with other features from different embodiments.

Advantageously, the holder 120 in combination with the base 110 may provide a slot for a lid to be stored. The attachment extension may provide a means for the pot or pan 300 to be suspended over the holder 120 with the front holder element 126 between the pot or pan 300 and the lid 200. The separation between the pot or pan 300 and the lid 200 prevents the lid 200 from contacting the pot or pan 300 and thus prevents the lid 200 and pot or pan 300 from scratching or otherwise damaging one another. Accordingly, the device allows the pot or pan 300 and lid 200 to be held together without damaging each other. The holding device 100 may be secured to a wall or other structure by nails, pegs, latches, brackets, etc. (not shown) so that the holding device 100 may be in a convenient location for a person to access the pot or pan 300 and lid 200. Accordingly, the holding device 100 provides advantages in accessibility and also in keeping the pot or pan 300 and lid 200 together.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A device comprising:
   a base including a front surface which extends in a front plane;
   a front holder element;
   a first holder element attached to the front surface between the front surface and the front holder element, the first holder element including a first surface, wherein the first surface extends in a first plane, wherein the first plane is not parallel to the front plane;
   a second holder element attached to the front surface between the front surface and the front holder element, the second holder element including a second surface, wherein the second surface extends in a second plane, wherein the second plane is not parallel to the front plane and the second plane is different from the first plane; and
   an attachment extension attached to the front surface, wherein
   the attachment extension is arranged to secure a pot or pan on the base such that the pot or pan rests on the front holder element, and
   the front holder element, the first holder element, the second holder element and the base define a slot arranged to secure a lid for the pot or pan between the pot or pan and the base when the pot or pan is secured on the base by the attachment extension, and
   the first holder element and the second holder element are arranged to form a general 'v' shape in the front plane.

2. The device of claim 1, wherein the front holder element extends in a front holder plane parallel to the front plane.

3. The device of claim 1, wherein the front holder element includes a concave indent, wherein the first surface faces the concave indent and the second surface faces the concave indent.

4. The device of claim 3, wherein the concave indent extends entirely through the front holder element in a direction perpendicular to the front plane and a shape of the front holder element in the front plane includes the concave indent, and wherein the concave indent extends at least 1 inch into the shape of the front holder element in the front plane.

5. The device of claim 1, wherein the first plane intersects the front surface extending in a first direction, the second plane intersects the front surface extending in a second direction, and an angle between the first direction and the second direction in the front plane is between 45 and 150 degrees.

6. The device of claim 5, wherein the attachment extension is attached to the front surface of the base in an area of the front plane between the first direction and the second direction.

7. The device of claim 6, wherein a gap exists between the first holder element and the second holder element in the front plane.

8. The device of claim 7, wherein a direction between the gap and the attachment extension in the front plane is a third direction, and the third direction is within about 10 degrees of a middle angle in the middle between the first direction and the second direction in the front plane.

9. A device comprising
   a holder connected to a base to form a slot, the holder including a first holder element, a second holder element, and a front holder element, wherein the first holder element and the second holder element are arranged to form a general 'v' shape in a front plane, wherein the front holder element connects the first holder element and the second holder element; and
   an attachment extension connected to the base above and aligned with the general 'v' shape of the first holder element and the second holder element in the front plane, wherein
   the attachment extension is arranged to secure a pot or pan on the base such that the pot or pan rests on the front holder element, and
   the front holder element, the first holder element, the second holder element and the base define the slot arranged to secure a lid for the pot or pan between the pot or pan and the base when the pot or pan is secured on the base by the attachment extension.

10. The device of claim 9, wherein the front holder element includes a concave indent above and aligned with the general 'v' shape of the first holder element and the second holder element.

11. The device of claim 9, wherein the general 'v' shape of the first holder element and the second holder element is between 45 and 150 degrees.

12. The device of claim 9, wherein a gap exists between the first holder element and the second holder element in the front plane.

13. The device of claim 12, wherein the first holder element and the second holder element do not directly touch.

14. The device of claim 12 wherein the front holder element includes a concave indent above and aligned with the gap relative to the general 'v' shape of the first holder element and the second holder element.

15. The device of claim 14, wherein the concave indent extends entirely through the front holder element in a direction perpendicular to the front plane and a shape of the front holder element in the front plane includes the concave indent, and wherein the concave indent extends at least 1 inch into the shape of the front holder element in the front plane.

16. The device of claim 14, wherein the front holder element extends over the entire first holder element in the front plane and extends over the entire second holder element in the front plane.

17. A device comprising:
a base including a front surface which extends in a front plane;
a holder connected to the base to form a slot, the holder including a first holder element, a second holder element, and a front holder element, wherein the first holder element and the second holder element are attached between the base and the front holder element, wherein the front holder element includes a concave indent, wherein the concave indent extends entirely through the front holder element in a direction perpendicular to the front plane and a shape of the front holder element in the front plane includes the concave indent; and
an attachment extension attached to the front surface, wherein
the attachment extension is arranged to secure a pot or pan on the base such that the pot or pan rests on the front holder element, and
the front holder element, the first holder element, the second holder element and the base define the slot arranged to secure a lid for the pot or pan between the pot or pan and the base when the pot or pan is secured on the base by the attachment extension, and
the holder has a general 'v' shape in the front plane.

18. The device of claim 17, wherein the concave indent extends at least 1 inch into the shape of the front holder element in the front plane.

19. The device of claim 17, wherein a gap exists between the first holder element and the second holder element in the front plane, wherein the front holder element includes a concave indent above and aligned with the gap relative to the general 'v' shape of the holder, and the attachment extension is connected to the base above and aligned with the general 'v' shape of the holder in the front plane.

* * * * *